(12) United States Patent
Feres

(10) Patent No.: US 6,943,523 B2
(45) Date of Patent: Sep. 13, 2005

(54) BRUSHLESS MOTOR CONTROL SYSTEM

(75) Inventor: Jacques Feres, Mont-Geard (FR)

(73) Assignee: MIDI Ingenierie, Castanet Tolosan Cedex (FR)

( * ) Notice: Subject to any disclaimer, the term of this patent is extended or adjusted under 35 U.S.C. 154(b) by 0 days.

(21) Appl. No.: 10/466,314

(22) PCT Filed: Jan. 30, 2002

(86) PCT No.: PCT/FR02/00357
§ 371 (c)(1),
(2), (4) Date: Nov. 17, 2003

(87) PCT Pub. No.: WO02/061936
PCT Pub. Date: Aug. 8, 2002

(65) Prior Publication Data
US 2004/0075412 A1 Apr. 22, 2004

(30) Foreign Application Priority Data
Jan. 31, 2001 (FR) .............................. 01 01332

(51) Int. Cl.⁷ ............................................. H02P 8/00
(52) U.S. Cl. .................... 318/696; 318/685; 318/41; 318/45; 318/47
(58) Field of Search ................. 318/696, 685, 318/41, 45, 47

(56) References Cited

U.S. PATENT DOCUMENTS

| | | | | |
|---|---|---|---|---|
| 4,084,248 A | * | 4/1978 | Scott | 702/85 |
| 4,146,908 A | * | 3/1979 | Vandling | 358/420 |
| 4,710,690 A | * | 12/1987 | Reid et al. | 318/685 |
| 4,853,602 A | * | 8/1989 | Hommes et al. | 318/38 |
| 4,897,589 A | * | 1/1990 | Fujiwara et al. | 318/685 |
| 5,637,972 A | * | 6/1997 | Randall et al. | 318/616 |
| 5,913,276 A | * | 6/1999 | Kurono et al. | 112/470.01 |

* cited by examiner

Primary Examiner—Rita Leykin
(74) Attorney, Agent, or Firm—Bacon & Thomas, PLLC

(57) ABSTRACT

For self-switching control of a brushless motor (10) powered by means of a predetermined electrical cycle in order to cause the rotor to advance, the control system comprises an indicator device (100) for indicating the mechanical position of the rotor, the device being associated with a detector device (50) forming an incremental coder device (150) for encoding the mechanical position of the rotor. The system also comprises a motor control assembly made up of processor means (20) for processing the signals coding the mechanical position of the rotor connected to regulator means (30) for powering the plurality of stator windings. The device for indicating the mechanical position of the rotor comprises at least one series (101) of indications of the mechanical position of the rotor corresponding to passing through one electrical cycle of the stator, whereby the incremental coder device (150) delivers the processor means with one synchronization signal for each electrical cycle.

15 Claims, 4 Drawing Sheets

BRUSHLESS MOTOR CONTROL SYSTEM

FIELD OF THE INVENTION

The present invention relates to controlling brushless motors. More particularly, the invention relates to a system enabling automatic synchronization of stepper motors in order to prevent them losing synchronization.

PRIOR ART

Brushless type motors include stepper motors in particular. These motors are usually in an open loop configuration, which means that such motors must be operated with a large reserve of torque, in particular to be able to withstand large variations in load on the shaft of the motor.

Whatever the intended utilization, control of the motor, whether in voltage or in current, can be adjusted quickly and reliably only if the mechanical position of the driven rotor coincides with the magnetic field created inside the motor. In order to guarantee that this applies without a special system for controlling power supply to the poles of the motor as a function of these parameters, it is necessary for the motor to operate under conditions that are ideal, i.e. the torque of the mechanical load applied to the rotor must be less than the torque available from the motor. Naturally, such conditions are not always guaranteed, and accurate monitoring of motor control is essential in most industrial applications of stepper motors.

Thus, in order to remedy a fundamental drawback of brushless or stepper type motors, namely that of loss of rotor synchronization, various solutions have been devised.

One such solution consists in using a member for copying movements of the motor in order to verify at the end of a movement that it has taken place correctly. Although that type of monitoring is satisfactory in certain applications that need to be made secure, in particular in the medical field, it nevertheless remains a solution which acts a posteriori to verify that a movement has indeed taken place, which can lead to delays in the response of the motor to the applied command, and it does not guarantee that the motor will not lose synchronization.

A more elaborate solution consists in controlling the motor by self-switching which uses a multipole syncrore-solver to determine the mechanical position of the rotor. However, that system presents the drawback of considerable extra cost associated with implementing a syncroresolver and the associated processing. That solution which is rather complicated in terms of implementation increases the cost of using a system for controlling a stepper motor very significantly since it requires a syncroresolver and complex analog-to-digital processing electronics to be used. Furthermore, the passband associated with such processing is generally not very large, which, amongst other things, reduces the apparent "stiffness" of the motor.

OBJECT AND BRIEF SUMMARY OF THE INVENTION

The present invention seeks to remedy the above-mentioned drawbacks and to provide, at low cost, a brushless motor control system which ensures rapid and reliable synchronization between the mechanical position of the rotor and the magnetic field that is created.

These objects are achieved by a control system for a brushless motor comprising a rotor and a stator having a plurality of phase windings powered electrically in a predetermined electrical cycle to cause the rotor to advance, said system comprising: an indicator device for indicating the mechanical position of the rotor and placed on the shaft thereof; a detector device for measuring the mechanical position of the rotor from the indicator device, and co-operating therewith to form an incremental coder device for the mechanical position of the rotor; and a motor control assembly comprising processor means for processing signals encoding the mechanical position of the rotor connected to regulator means for regulating the power supply to the plurality of stator windings; the system being characterized in that the indicator device for indicating the mechanical position of the rotor comprises at least one series of indications of the mechanical position of the rotor corresponding to passage through one electrical cycle of the stator, whereby the incremental coder device delivers a synchronizing signal to the processor means for all electrical cycles.

Thus, a position indicator device of the invention can advantageously be mounted on any brushless motor, and in association with specifically programmed or hard-wired processor means, it enables synchronization to be achieved rapidly and reliably between the magnetic field created in the motor and the mechanical position of the rotor. This makes it possible to implement a digital shaft capable of operating at speed that is controlled in position or in torque in an assembly that is completely self-contained and of low cost.

In an embodiment of the invention, the brushless motor is a stepper type motor.

In an aspect of the invention, the regulator means delivers a signal to the processor means, said signal corresponding to the phase offset of the current injected into the plurality of stator windings.

In an embodiment of the invention, the indicator device further comprises a second series of indications of the mechanical position of the rotor, of number greater than the number of indications in the first series.

More particularly, the indicator device comprises a disk in which each series of indications is formed by a plurality of steps of marks suitable for being detected by the optical detector device, said plurality of marks being disposed uniformly in a circular band around the shaft of the disk.

In a particular aspect of the invention, the disk comprises a first plurality of fifty sets of marks disposed in a first circular band and corresponding to fifty electrical cycles of the motor.

In another particular aspect of the invention, the disk further comprises a second plurality of 500 sets of marks uniformly disposed in a second circular band adjacent to the first band.

The system may further comprise second processor means connected to said first processor means and including means for generating motor speed profiles and external connection means.

More specifically, the processor means are constituted by a microprocessor, or by a dedicated integrated circuit.

According to a particular characteristic of the invention, the first processor means includes means or storing an offset between the position of the indicator device and the mechanical position of the rotor. In which case, the processor means synchronizes each electrical cycle automatically on the mechanical position of the rotor while taking account of the stored offset.

In a particular embodiment of the invention, the first processor means operates either by tracking speed profile, or by tracking the mechanical position of the rotor in order to avoid loss of synchronization, with switchover between the two modes being implemented automatically.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF PARTICULAR EMBODIMENTS

Figure 1:
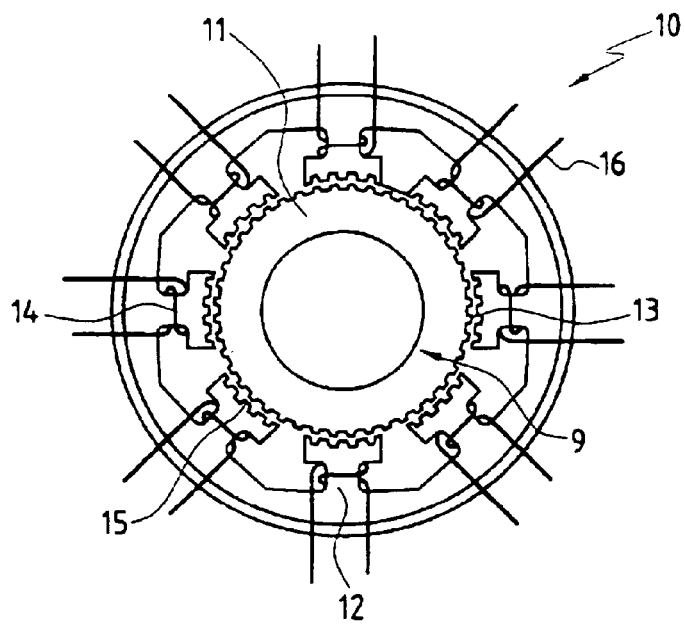
FIG. 1 is a section view of a hybrid type stepper motor having 200 steps.

The system of the present invention that is described below relates to a type of brushless motor that is in very widespread use, namely a hybrid type stepper motor having 200 steps, as shown in FIG. 1. Nevertheless, any other type of stepper or brushless motor could be used in the system of the invention. In the light of the description below, the person skilled in the art will have no difficulty in devising variant embodiments comprising stepper motors or brushless motors having some other type of power supply or a different number of steps.

The motor 10 comprises a stator portion 12 surrounding a rotor portion 11. The rotor 11 comprises two circular pieces each having fifty teeth 13. Between these two pieces there is a permanent magnet (not shown) thus creating a south pole on one piece and a north pole on the other. The portion of the rotor 11 that is visible in FIG. 1 corresponds to one of the two pieces. These two pieces or pole disks are offset by an electrical angle of π; thus, with fifty teeth, the rotor is equivalent to fifty pairs of poles. Furthermore, the stator has eight poles 14 each possessing five teeth 15 giving a total of forty teeth. Around each pole 14 there is wound a coil 16. Consequently, if a current flows in one pair of stator coils, the resulting poles will respectively attract teeth of opposite polarities, at each end of the rotor. The rotor can thus take up as many positions as there are positions of alignment between the teeth of the rotor and of the stator, which corresponds to the number of steps per revolution. Consequently, in the present case, the motor 10 presents 200 steps per revolution.

Regardless of whether the motor operates in unipolar or in bipolar mode, in two phases (as applies to the motor described), in three phases or more, with integer steps, half-steps, or micro-steps, the motor is always caused to turn by means of a sequence of power supply configurations in a circular permutation in one direction or the other. Each sequence corresponds to a so-called "electrical" cycle which can be represented by a trigonometrical circle: in two-phase mode, the currents of the two phases are represented by the sine and cosine functions of the electrical angle and their period corresponds to the electrical cycle. In the embodiment described herein, a complete electrical cycle corresponds to four motor steps, and consequently there exists a relationship between mechanical angle and electrical angle, and more precisely, since the motor comprises 200 steps per revolution, one electrical cycle corresponds to a mechanical angle of:

$$\frac{360}{200} \times 4 = 7.2°$$

In order to drive the motor in a manner that is controlled either in speed, in torque, or in position, it is essential to control the coils of the stator phases synchronously with the mechanical position of the rotor.

Systems making use of multipole syncroresolvers or of absolute position coders enable the motor to be controlled in self-switching mode. Nevertheless, as explained above, such systems are relatively expensive and possess neither a passband of sufficient width to implement precise speed servo-control (in particular at high speed), nor sufficient stiffness to implement precise position servo-control without using stepdown gearboxes.

Since the phases are excited in electrical cycles (corresponding in this case to four motor steps), in order to maintain proper control over the motor while it is in use, it is necessary to be in a position to guarantee synchronization for each electrical cycle. If the motor loses synchronization during an operating process, then its mechanical position is no longer synchronized with the corresponding electrical cycle, so real time control of the motor at electrical cycle scale becomes essential.

In order to remedy this problem, the present invention thus proposes making use jointly of a programmable device and a specific incremental coder serving to provide the mechanical position of the rotor at definition that is considerably greater than that of the motor step size.

With this system, it is possible to operate any stepper motor by relying on synchronized self-switching between the magnetic field created electrically and the instantaneous position of the rotor.

Figure 2:
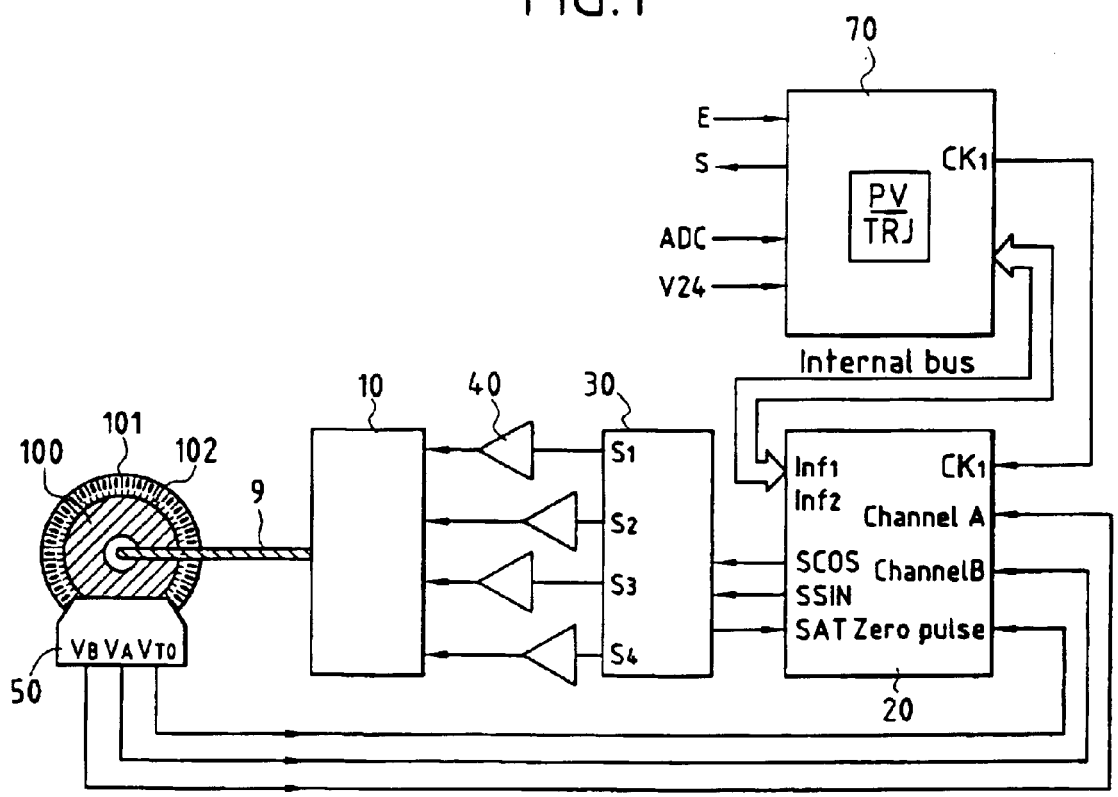
FIG. 2 is a simplified circuit diagram of an embodiment of the invention.

FIG. 2 shows an embodiment of the system of the invention. The system mainly comprises a stepper motor 10 having the above-described configuration of a disk 100 and an optical detector device 50 forming an incremental coder 150, a first processor device 20 such as a microcontroller, a current regulator 30, and a series of amplifiers 40. The optical disk 100 having the special design of the invention is fixed to the shaft 9 of the rotor of the motor 10. The optical disk 100 is constrained to move with the rotor and presents the same angular displacement as the rotor when it is set into rotation by exciting the stator coils.

Figure 3:
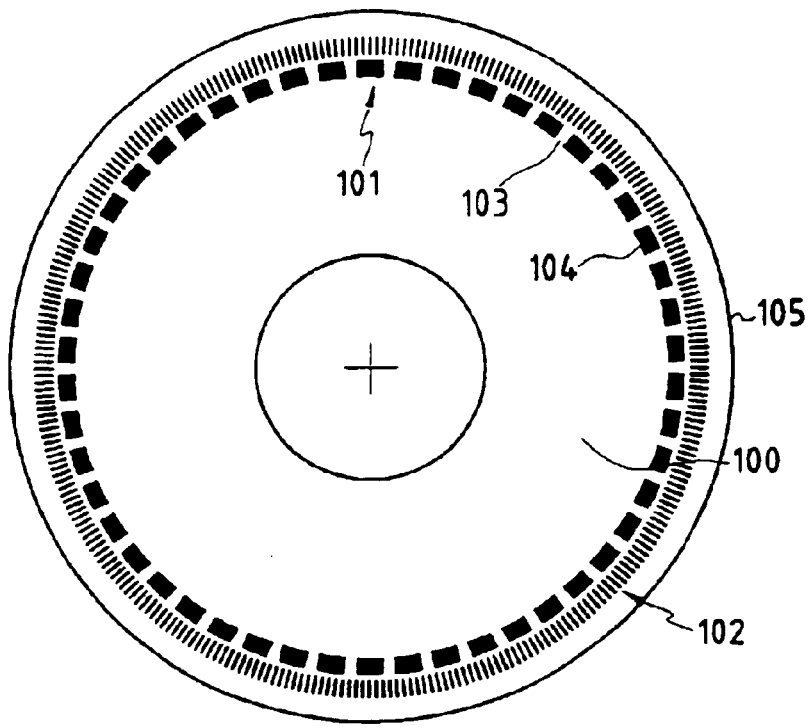
FIG. 3 is a simplified view of an optical disk in an embodiment of the present invention.

The structure of the disk 100 that is specially designed in accordance with the invention is shown in FIG. 3. The optical disk 100 is constituted by a circular turntable 105 having first and second circular bands 101 and 102 disposed in the vicinity of the periphery of the turntable 105. Each of the bands 101 and 102 comprises a pattern made up of alternating distinctive marks suitable for being read by a conventional optical detector device. Optical detection can be implemented in various ways, either by direct transmission, or by reflection. The electrical signal delivered by the detector device can be associated with the presence or the absence of optical signals, or with a combination of both presence and absence. When the detector device operates by direct transmission, it comprises one or more light emitter/ receiver pairs disposed on either side of the disk. In reflection, the emitter and the corresponding receiver are both disposed on the same side of the disk.

For optical detection by direct transmission, the turntable 105 may be constituted by a transparent disk on which opaque marks modulate transmission of a light beam. Alternatively, the turntable may be an opaque disk in which the marks are constituted by openings allowing the light beam to pass through.

For optical detection by reflection, the marks disposed on the disk may be reflective and the disk may be opaque, or vice versa. For either kind of detection, the turntable may be made by a metallization technique or by a photoetching technique.

Furthermore, the above-described incremental coder using optical detection technology could equally well be made using magnetic type technology (Hall effect, etc.).

The first band 102 or set of marks serves to provide a conventional incremental coder for giving the relative position of the rotor of the motor with the desired resolution.

When a set of marks appears in the alignment of the detector members of one of the channels of the device 50, it issues a signal synchronously with the passage of said marks. Since the detector members of two channels of an incremental coder are offset by one-fourth of the pitch of the marks in the band 102, the signals generated during movement of the disk are in quadrature and the direction of the phase offset depends on the direction of rotation of the disk.

The pitch W of the marks depends on the desired resolution. In the embodiment shown, the resolution used is 10 microsteps per step, i.e. 2000 microsteps per revolution of the motor, giving 500 marks 106.

Since an incremental coder can be decoded in such a manner as to produce four transitions per mark, the pitch of the marks W is thus:

$$360°/500=0.72°$$

The actual configuration of the marks (in width, height, optical radius, . . . ) is adapted to the particular model of commercially available detector member 50 that is used.

A second band 101 or set of marks serves to determine the phase of the electrical cycle of the stator on the real movement of the rotor. This band 101 thus comprises a pattern of periodicity that corresponds in the embodiment shown to four motor steps, like the period of the electrical cycle.

Thus, since the motor has 200 steps per revolution and one electrical cycle has four steps, the number of patterns 103 on the disk is 50, and they are regularly spaced apart at a pitch of 7.2° all around the disk.

As for the first above-described band, the actual configuration of the band 101 (or set of marks) is adapted to the particular model of detector member 50 that is used and may therefore take different shapes as a function of said member.

Figure 4:
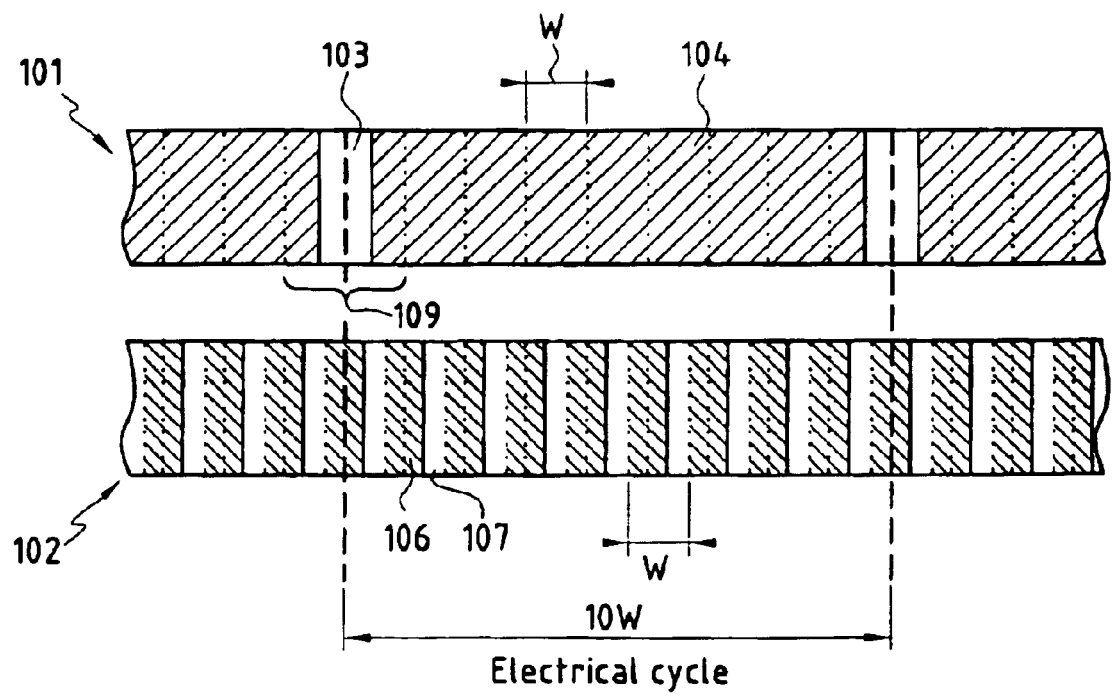
FIG. 4 is a developed view of a portion of the circular bands shown in FIG. 3.

FIG. 4 shows one example of the respective positions of the patterns of the bands 101 and 102. The real shape of the patterns used depends on the detection characteristics of the detector member 50 used.

Having a band with ten transitions per electrical cycle is merely a question of choice, and 12, 16, or 24 transitions would be equally suitable. Selecting ten transitions per cycle provides an electrical angle that is sufficiently fine to make it possible to optimize the load angle in the motor without penalizing the electronics by an acquisition frequency that is too great at high speed.

The disk 100 designed in this way in accordance with the invention can be used with conventional optical detector devices such as, for example, standard three-channel optical coder forks.

Thus, the optical disk 100 of the invention associated with an optical detector device 50 provides a low cost solution for a three-channel incremental coder serving to determine the mechanical position of the rotor to within one-tenth of an electrical cycle with synchronization being possible for all electrical cycles.

Figure 5:
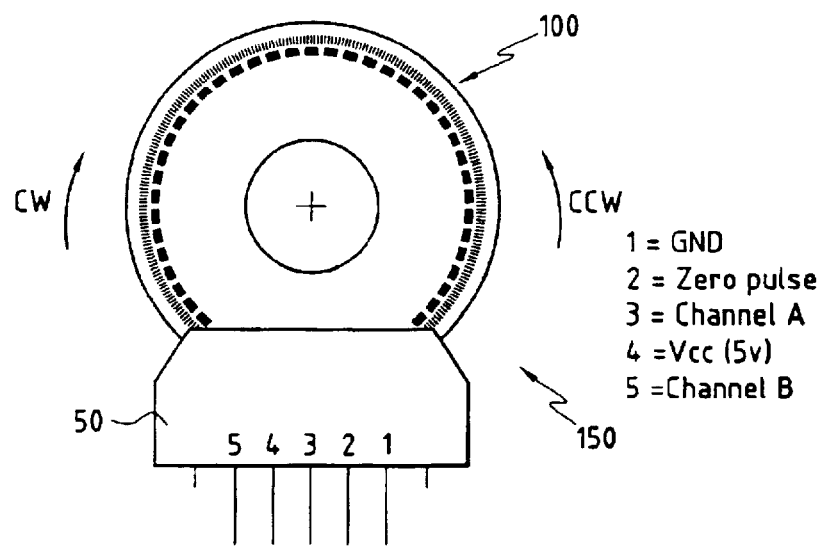
FIG. 5 is a view showing the incremental coder device of an embodiment of the present invention.
Figure 6:
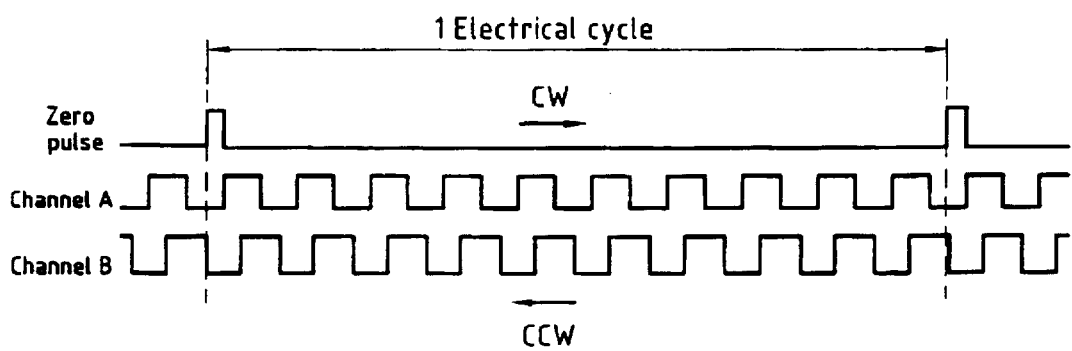
FIG. 6 is a diagram showing the signals generated by the optical detector device on the optical disk.

FIG. 5 shows the incremental coder 150 including the optical detector device 50 and having five output pins. With reference to FIG. 6, the pin 2 reads the pattern of the band 101 and emits a "zero pulse" signal which corresponds to one electrical cycle whereas the pins 3 and 5 read the band 102 and respectively emit two signals in quadrature referred to as "channel A" and "channel B". These two signals enable the position of the rotor to be determined by counting up and down using a conventional decoder function programmed in the microcontroller.

The value of the mechanical position is compared with the value of the magnetic field position that is directly linked to the current flowing in the motor coils so as to measure the load angle. The position of the magnetic field is referred to as the "electrical" position. Unlike conventional brushless or self-switched operations, this angle is not forced to 90° (or −90° for braking). If this angle exceeds +90° (or −90°), then the electrical position is no longer incremented (or decremented) by the step clock but is limited to the mechanical position given by the pulses from the coder. This solution ensures that the rotor does not lose synchronization since the magnetic field of the stator cannot be too far ahead of the rotor (or too far behind during braking).

Operation of the system of the invention is explained below with reference again to FIG. 2.

The microcontroller 20 which controls electrical power supply to the stator coils via the regulator 30 receives the three signals "channel A", "channel B" and "zero pulse" emitted by the coder 150 as described above. These signals have the waveforms shown in FIG. 6 for one electrical cycle. After processing, the microcontroller 20 sends information to the regulator 30 for powering the coils in the form of two voltage control signals "SCOS" and "SSIN". The signals "SSIN" and "SCOS" represent the amplitude of the current desired for the two phases of the motor, and the appearance of the signals is sinusoidal. The argument of the resulting electrical vector is equal to the above-defined electrical angle and its phase offset relative to the mechanical position given by the coder is controlled as described above.

The regulator 30 shown in FIG. 2 is a chopper regulator associated with four power amplifiers 40 driving the motor in unipolar mode.

It is equally possible to use a linear regulator or bipolar mode drive.

Figure 7:
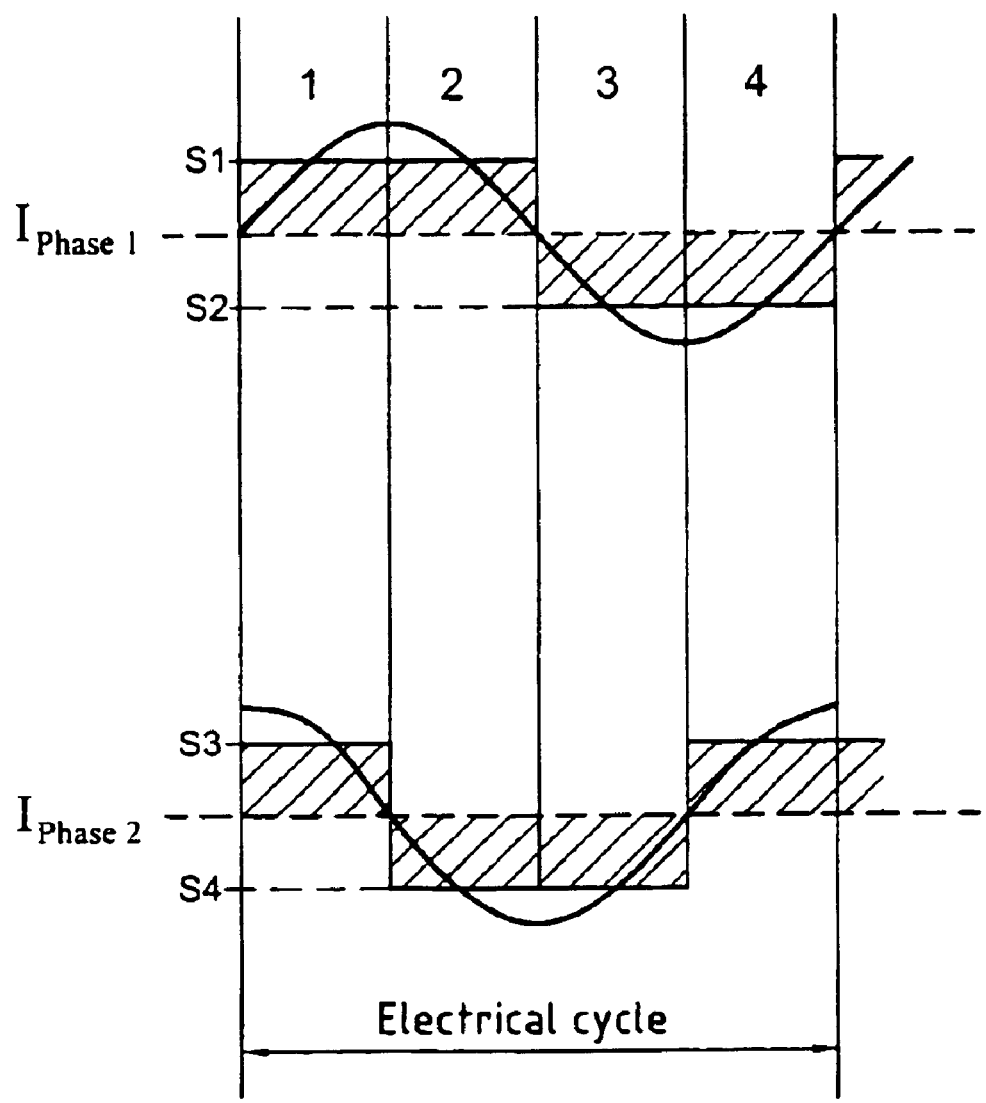
FIG. 7 is a diagram showing the different states of current in the windings of the motor for one electrical cycle.

The outputs $S_1$ and $S_2$ represent current amplitude for the first phase, $S_1$ in the positive direction and $S_2$ in the negative direction. For a chopper regulator, these signals are of the pulse width modulated (PWM) type. For a linear regulator, they are analog signals. In similar manner, the signals $S_3$ and $S_4$ are associated with the second phase of the motor. FIG. 7 shows the appearance of the signals over one electrical cycle in an analog representation, avoiding saturation, and their appearance is identical to the current injected into the motor phases.

The current is injected into the coils as a function of the measured mechanical position, thus making it possible with the disk of the invention to have synchronization once every electrical cycle of four motor steps at most, and to achieve this without having recourse to an absolute coder or to a syncroresolver associated with an external control device.

Controlling the motor in accordance with the invention provides numerous advantages in practical use of the motor.

When the motor is switched on, the microcontroller can initiate drive movement of the rotor initially without reference to synchronization until a zero pulse is detected. Once the zero pulse has been detected, the microcontroller synchronizes the beginning of an electrical cycle on the mechanical position of the rotor. Consequently, with this system, synchronization occurs within a maximum of four steps when the motor is switched on. This avoids any need to perform special initialization of the rotor (vibration, speed stabilization, . . . ) every time the motor is switched on, and guarantees that synchronization will occur even when there is a force acting on the motor shaft.

Furthermore, for reasons due to the self-induction of the motor, current does not become established immediately in the coils on each transition. Consequently, the magnetic field is correspondingly delayed. In order to correct this delay, the regulator 30 issues a "SAT" signal which is an image of the delay of the current injected into the stator coils and which thus serves to measure the delay of the magnetic field.

Consequently, in order to compensate for this delay, particularly as speed rises, the system implements advance correction on the current by comparing the zero pulse signal of the coder with the SAT signal from the regulator; this makes it possible automatically to correct the electrical phase offset by applying a corresponding advance to the control signals SSIN and SCOS which adapt automatically to the model of motor and to the power supply voltage used. The microcontroller measures the delay of the injected current by means of the SAT signal and the zero pulse signal. From this measurement, the digital circuit deduces the values that should be given to the control signals SSIN and SCOS so as to cause the two signals SAT and zero pulse to coincide. This phase correction is processed by a servo-control loop that is slower than the loop for controlling load angle proper.

Another advantage of the system of the invention is that the incremental coder 150 can be mounted on the shaft of the motor without taking special precautions. The microcontroller 20 is used, in the factory, to measure the phase offset between the optical coder and the magnetic field of the rotor (identical to the mechanical position of the rotor at zero load) and thereafter offsets the zero pulse signal by said measured value. The measured offset is thus stored in memory in the program of the microcontroller which can then process the signals it receives from the coder with the necessary correction. This method makes it possible for the construction of the coder and its assembly on the motor to be performed at low cost without requiring any mechanical setting.

The various steps described above are implemented by program code stored in the microcontroller. Nevertheless, it is not essential to use a microcontroller. An application specific integrated circuit (ASIC) could also be used. In which case, all of the processing functions that are of use in the invention and that are programmed and stored in the microcontroller are implemented in an integrated circuit that is hard-wired specifically to perform said functions.

Furthermore, second processor means 70 may be provided in the system of the present invention. The second processor means is connected to the first processor means 20 via a bus and serves to generate by specific programming speed profiles "PV" or trajectories "TRJ" for the motor. This processor means also has V24 serial connection means, an analog to digital convertor (ADC), etc. and various inputs/outputs for communicating with external devices, depending on requirements.

This second processor means and possibly also the regulator means can be integrated in the same microprocessor or ASCI as the first processor means 20.

By means of the control system of the present invention, synchronization can be situated anywhere on the electrical cycle. There is no need to perform mechanical setting of the indicator device 100 relative to the rotor. Finally, the delay involved in establishing current in the windings of the stator at high speed is compensated in self-adaptive manner by a phase advance system managed by the processor means 20.

What is claimed is:

1. A control system for a brushless motor or stepping motor comprising a rotor mounted on a shaft and a stator having a plurality of phase windings powered electrically in a predetermined electrical cycle to cause the rotor to advance, said system comprising:
    an indicator device for indicating the mechanical position of the rotor and placed on the shaft thereof;
    an optical detector device for measuring the mechanical position of the rotor from the indicator device, and co-operating therewith to form an incremental coder device for the mechanical position of the rotor; and
    a motor control assembly comprising processor means for processing signals encoding the mechanical position of the rotor connected to regulator means for regulating the power supply to the plurality of stator windings;
    wherein the indicator device for indicating the mechanical position of the rotor comprises at least a first series of indications arranged in a pattern of periodicity that corresponds to a period of an electrical cycle of the motor so as to provide an indication on the phase of the electrical cycle of the stator based on movement of the rotor, and the incremental coder device delivers a synchronizing signal to the processor means, the processing means synchronizing the start of an electrical cycle on the mechanical position of the rotor for all electrical cycles.

2. The system according to claim 1, wherein the brushless motor is a stepper type motor.

3. A system according to claim 1, wherein the regulator means delivers a signal (SAT) to the processor means, said signal corresponding to the phase offset of the current injected into the plurality of stator windings, thereby enabling the delay between the real current and the reference therefor to be corrected.

4. The system according to claim 1, wherein the indicator device further comprises a second series of indications of the mechanical position of the rotor, of number greater than the number of indications in the first series.

5. The system according to claim 1, wherein the indicator device comprises a disk in which each series of indications is formed by a plurality of steps of marks suitable for being detected by the optical detector device, said plurality of marks being disposed uniformly in a circular band around the shaft of the disk.

6. The system according to claim 5, wherein the disk comprises a first plurality of fifty sets of marks disposed in a first circular band and corresponding to fifty electrical cycles of the motor.

7. The system according to claim 6, wherein the disk further comprises a second plurality of 500 sets of marks uniformly disposed in a second circular band adjacent to the first band.

8. The system according to claim 1, including a second processor means connected to said first processor means and including means for generating motor speed profiles and external connection means.

9. A system according to claim 1, wherein the or each processor means are constituted by a microprocessor.

10. The system according to claim 1, wherein the or each processor means are constituted by a dedicated integrated circuit.

11. The system according to claim 1, wherein the processor means includes means for storing an offset between the position of the indicator device and the mechanical position of the rotor.

12. The system according to claim 11, wherein the processor means synchronizes each electrical cycle automatically on the mechanical position of the rotor while taking account of the stored offset.

13. The system according to claim 1, wherein the processor means operates either by tracking speed profile, or by tracking the mechanical position of the rotor in order to avoid loss of synchronization, with switchover between the two modes being implemented automatically.

14. A control system for a brushless motor or stepping motor comprising a rotor mounted on a shaft and a stator having a plurality of phase windings powered electrically in a predetermined electrical cycle to cause the rotor to advance, said system comprising:

an indicator device for indicating the mechanical position of the rotor and placed on the shaft thereof;

an optical detector device for measuring the mechanical position of the rotor from the indicator device, and co-operating therewith to form an incremental coder device for the mechanical position of the rotor; and a motor control assembly comprising processor means for processing signals encoding the mechanical position of the rotor connected to regulator means for regulating the power supply to the plurality of stator windings;

wherein the indicator device comprises a first series of indications arranged in a pattern of periodicity that corresponds to a period of an electrical cycle of the motor so as to provide an indication on the phase of the electrical cycle of the stator based on the movement of the rotor, and a second series of indications arranged in a pattern providing an indication of the position of the rotor;

wherein the incremental coder device delivers a synchronizing signal to the processor means, the processing means synchronizing the start of an electrical cycle based on the mechanical position of the rotor for all electrical cycles.

15. The system according to claim 14, wherein the disk further comprises a second plurality of 500 sets of marks uniformly disposed in a second circular band adjacent to the first band.

* * * * *